Patented Feb. 27, 1940

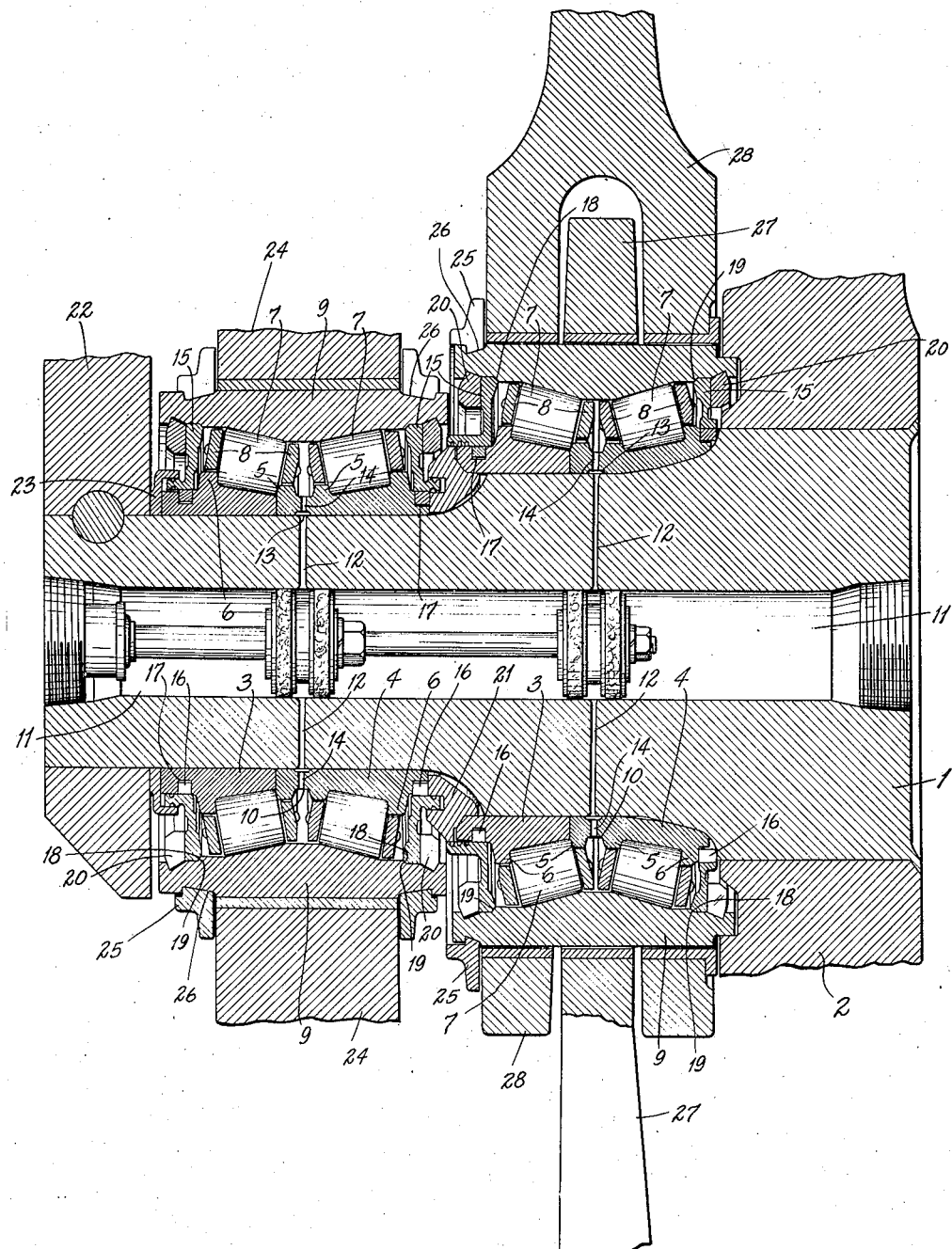

2,191,880

UNITED STATES PATENT OFFICE 2,191,880

BEARING

Clifford L. Eastburg, Canton, Ohio, assignor to The Timken Roller Bearing Company, Canton, Ohio, a corporation of Ohio Application June 24, 1939, Serial No. 281,003

14 Claims. (Cl. 308—207)

This invention relates to bearings, particularly double roller locomotive rod bearings. It has for its principal objects to provide for the easy removal of such bearing and to provide for simplicity and cheapness of construction and compactness of design. The invention consists in the double roller bearing and in the arrangements and combinations of parts hereinafter described and claimed.

The accompanying drawing, which forms part of this specification, is a central longitudinal section through a locomotive rod bearing construction embodying my invention.

The present construction comprises a main crank pin 1 mounted on a main driving wheel 2 of a locomotive. On this main crank pin or shaft are mounted two double, taper roller bearings located one on the inner end portion of said pin and the other on the reduced outer end portion thereof. The two double roller bearings are substantially the same except for differences in size and proportion.

Each of said bearings comprises two cones or inner raceway members 3 and 4 whose raceways taper towards each other and have guide ribs 5 at their small or adjacent ends and thrust ribs 6 at their remote ends. Circular series or rows of tapered rollers 7, with suitable retaining cages 8 therefor, are provided for the respective cones 3 and 4; and conical outer raceways for the respective series of rollers are formed in a single sleeve or common cup or outer raceway member 9.

As shown in the drawing, the two guide ribs 5 at the small or adjacent ends of the raceways of the two cones 3 and 4 of each double roller bearing are both formed integral with the innermost cone 4 of said bearing. The two guide ribs 5 are spaced apart to form therebetween an annular groove 10 that opens into the annular space between the inner and outer raceways of the bearing substantially midway of the ends thereof. This annular space is supplied with lubricant from an axial reservoir 11 in the crank pin through radial passageways 12 therein that open into an internal annular groove 13 formed in the bore of the inner raceway member 4 opposite the external annular groove 10 therein and radial passageways 14 in said member that lead from said internal groove to said external groove.

Each double bearing is provided with annular end closure plates 15 that fit between the inner and outer raceway members at the ends of the bearing and close the annular space therebetween. These end closures are sleeved on the adjacent ends of the respective inner raceway members and snugly fit split piston type sealing rings 16 that seat in annular grooves or recesses 17 provided therefor in said raceway members. Each end closure plate has a beveled surface 18 that is held against a beveled valve type seat 19 in the bore of the outer raceway member 9 by a split retaining ring 20 that seats in an internal groove provided therefor in said bore.

The two double roller bearings are spaced apart by means of a suitable spacer sleeve 21 sleeved on the crank pin in abutting relation to the adjacent ends of the inner raceway member 4 of the outermost bearing and the inner raceway member 3 of the innermost bearing. The bearings and spacer sleeve are held on the crank pin by the eccentric crank 22 of the locomotive valve gear (not shown), said crank being pinned on the outer end of said crank pin and serving to clamp a spacing ring 23 against the outer end of the inner raceway member 3 of the outermost bearing.

The main rod 24 of the locomotive is freely mounted on the outer raceway member of the outermost double bearing between retaining rings 25 mounted in external annular grooves 26 provided therefor on said raceway member on opposite sides of the rod end. Two side or coupling rods, a front side rod 27 and a rear side rod 28 are freely rotatable on the outer raceway member of the innermost double bearing between the hub portion of the main driving wheel and a retaining ring 25 seated in an external annular groove 26 near the outer end of said member. As shown in the drawing, the rear side rod 28 has a forked bearing receiving end and the adjacent end of the front side rod 27 is disposed between the two branches thereof. Thus, each bearing is in alinement with the stresses imposed thereon in service. Each of the rod abutment or retaining rings 24 is split to facilitate assembly thereof in the groove 25 of the outer raceway member.

By the arrangement described, each double bearing may be quickly and easily removed from the crank pin without removing the rod in which said bearing is mounted. The outermost end closure 15, lock ring 25 and sealing ring 16 are first removed from the outermost bearing. A suitable pulling implement is then engaged with the annular groove 17 vacated by said sealing ring and the single-ribbed outermost cone 3 is pulled off the end of the crank pin. The self-contained roller and cage assembly 7 and 8 is then withdrawn from the cup or outer raceway member 9, after which the pulling implement is engaged with the annular groove 10 in the outer end of the three-ribbed innermost cone 4 and, upon removal of the second lock ring 25, the inner bearing closure and cup are easily removed. The same method is employed in removing the innermost double roller bearing.

The groove 10 in the outer end portion of the innermost cone 4 provides an oil distributing groove as well as a pulling groove without increasing the overall length of the bearing, the cone 3 with the single rib thereon is more easily ground and gaged than the ordinary double ribbed cone, and the cone with the double rib at the small end thereof can be produced as easily as a cone with a single rib at the small end thereof.

What I claim is:

1. A double roller bearing comprising two bearing members having raceways thereon, one of said bearing members having two longitudinally spaced guide shoulders thereon, one for its own raceway and the other for the raceway of the other bearing member.

2. A double roller bearing comprising two inner bearing members having raceways thereon, one of said inner bearing members having two longitudinally spaced guide shoulders thereon, one for its own raceway and the other for the raceway of the other inner bearing member.

3. A double roller bearing comprising two bearing members having raceways thereon, one of said bearing members having two guide ribs integral therewith, one for its own raceway and the other for the raceway of the other bearing member.

4. A double roller bearing comprising two abutting inner bearing members having raceways thereon, one of said inner bearing members having a guide rib for its own raceway and also a guide rib for the raceway of the other inner bearing member.

5. A double roller bearing comprising two abutting inner bearing members having raceways thereon, one of said inner bearing members having a guide rib for its own raceway and also a guide rib for the raceway of the other inner bearing member, said guide ribs being spaced apart to form a groove therebetween.

6. A double taper roller bearing comprising two inner bearing members having raceways thereon that taper towards each other and have guide ribs at their adjacent ends and thrust ribs at their remote ends, the guide ribs for the raceways of both inner bearing members being both formed on one of said inner raceway members.

7. A double roller bearing comprising two abutting bearing members having raceways thereon, circular series of bearing rollers for the respective raceways, retaining cages for the respective series of rollers, one of said inner bearing members having a guide rib for the raceway of the other inner bearing member, the rollers and cage of said other inner bearing member being self-contained.

8. A double roller bearing comprising two abutting inner bearing members having raceways thereon, circular series of bearing rollers for the respective raceways, retaining cages for the respective series of rollers, and a common outer bearing member having raceways for the respective series of rollers, one of said inner raceway members having a guide rib for its own raceway and also a guide rib for the raceway of the other bearing member, the rollers and cage for said other inner bearing member being self-contained.

9. A double roller bearing comprising two abutting bearing members having raceways thereon, circular series of bearing rollers for the respective raceways, retaining cages for the respective series of rollers, and a common outer bearing member having raceways for the respective series of rollers, one of said inner bearing members having a guide rib for its own raceway and also a guide rib for the raceway of the other bearing member, the roller and cage for said other bearing member being self-contained, said guide ribs being spaced apart longitudinally to form an external peripheral groove therebetween, and passageways extending from the inner periphery of said first mentioned inner bearing member and opening into said annular groove.

10. A locomotive rod bearing construction comprising a pin, two abutting inner bearing members mounted on said pin and having separate raceways, a circular series of rollers for the respective raceways, retaining cages for the respective series of rollers, a single outer bearing member having raceways for the respective series of rollers, and a rod journaled on said outer bearing member, one of said inner bearing members having a guide rib for the raceway of the other inner bearing member, the rollers and cage of said other inner raceway member being self-contained.

11. A locomotive rod bearing construction comprising a pin having a lubricant reservoir therein and passageways leading from said reservoir to the outer periphery of said pin, two abutting inner bearing members mounted on said pin and having separate raceways, circular series of rollers for the respective raceways, retaining cages for the respective series of rollers, a single outer bearing member having raceways for the respective series of rollers, and a rod journaled on said outer bearing member, one of said inner bearing members having a guide rib for its own raceway and also a guide rib for the raceway of the other bearing member, the roller and cage for said other bearing member being self-contained, said guide ribs being spaced apart longitudinally to form an external peripheral groove therebetween, and passageways extending from the inner periphery of said first mentioned inner bearing member and opening into said annular groove.

12. In a lubricating bearing construction, a double roller bearing, a shaft therein having an axial lubricant reservoir and radial passageways leading from said reservoir and opening through the outer surface of said shaft, said bearing including two inner raceway members, one of said raceway members having annular guide shoulders thereon for the adjacent ends of the raceways of both of said raceway members and radial passageways communicating at one end with the passageways leading from said reservoir and at the other end with said bearing substantially midway of said annular guide shoulders.

13. In a lubricating bearing construction, a double roller bearing, a shaft therein having an axial lubricant reservoir and radial passageways leading from said reservoir and opening through the outer surface of said shaft, said bearing including two inner raceway members, one of said raceway members having external guide ribs thereon for the adjacent ends of the raceways of both of said raceway members, an external annular groove between said ribs and radial passageways communicating at one end with the passageways leading from said reservoir and at the other end with said annular groove.

14. A lubricating locomotive rod bearing construction comprising a double roller bearing, a crank pin therein having an axial lubricant reservoir and radial passageways leading from said reservoir and opening through the outer surface of said crank pin, and a closure for the outer end of said reservoir, said bearing including two inner raceway members, one of said raceway members having annular guide shoulders thereon for the adjacent ends of the raceways of both of said raceway members and radial passageways communicating at one end with the passageways leading from said reservoir and at the other end with said bearing substantially midway of said annular guide shoulders.

CLIFFORD L. EASTBURG.